Patented Apr. 4, 1939

2,152,852

UNITED STATES PATENT OFFICE 2,152,852

PROCESS FOR MANUFACTURE OF GLYCOLIC ACID

Donald John Loder, Wilmington, Del., assignor to E. I. du Pont de Nemours & Company, Wilmington, Del., a corporation of Delaware No Drawing. Application December 31, 1936,
Serial No. 118,569

27 Claims. (Cl. 260—535)

This invention relates to a process for the preparation of glycolic acid and is more especially related to the preparation of glycolic acid by the interaction of formaldehyde with carbon monoxide.

Glycolic acid, otherwise known as hydroxyacetic acid, ethanolic acid, and having the formula CH₂OHCOOH, has been usually prepared heretofore by treating monochlor acetic acid with caustic potash. In an attempt to develop more economical processes for its preparation various other methods have been proposed as for example, the oxidation of ethylene glycol to glycolic aldehyde followed by the subsequent oxidation of glycolic aldehyde to glycolic acid and via the preparation of formaldehyde cyanhydrin followed by hydration. Due in large measure to the high cost of the basic materials required for the manufacture of this acid by these and other known processes, the acid has been expensive, and consequently has been limited in many of the important uses for which it is adapted.

An object of the present invention is to provide an improved process for the preparation of glycolic acid. Another object of the invention is to provide an economical process for the preparation of glycolic acid from inexpensive raw materials. Yet another and more specific object of the invention is to provide a process wherein formaldehyde is interacted with carbon monoxide in the presence of water and an acidic type catalyst to obtain glycolic acid. A further object is to provide catalysts for this process. Other objects and advantages of the invention will hereinafter appear.

The above and other objects of the invention are realized by dissolving formaldehyde, or one of its polymers, in water, and, preferably in the presence of a catalyst having acidic characteristics, subjecting the resulting solution to heat and pressure and an atmosphere of carbon monoxide, whereupon glycolic acid is obtained in accordance with the equation:

$$HCHO + CO + HOH \rightarrow CH_2OHCOOH$$

This reaction may be carried out by placing the mixture of aldehyde, water and catalyst in an autoclave applying the necessary pressure by forcing in carbon monoxide and effecting the reaction by the application of heat.

The formaldehyde may be subjected to the reaction in any convenient way or in any convenient form. Thus formaldehyde may be dissolved in water to give an aqueous solution thereof containing up to approximately 62% formaldehyde (for instance, technical "formalin"), or solutions of polymeric formaldehyde, e. g., paraformaldehyde or trioxymethylene, may be used. Such solutions may be employed for reaction with carbon monoxide, after, if desired, dissolving therein a suitable quantity of catalyst.

I have found that, in the absence of added catalysts the reaction is initiated only slowly but, being mildly autocatalytic, will proceed progressively more rapidly after it has started, since glycolic acid and acidic by-products of the reaction, such as formic acid, accelerate the reaction. Initiation of the reaction is more rapid if a compound of an acidic nature, for example an organic acid, such as glycolic acid or formic acid, or an inorganic acid, such as hydrochloric, sulfuric or phosphoric acid is present, although the reaction will start without the addition of any substance in the nature of a catalyst.

Added catalysts are not, therefore, required to either institute or maintain the reaction. But I have found that they may be used with advantage to insure more rapid attainment of equilibrium conditions. The deleterious effect of certain side reactions may be lessened appreciably by accelerating the glycolic acid synthesis reaction. This is accomplished by adding such widely different compounds as formic acid, phosphoric acid, sodium acid phosphate, glycolic acid itself and hydrochloric acid. Many actual trials have demonstrated that organic and inorganic catalysts which have or give a free hydrogen ion are suitable altho, of course, some are more effective than others.

Acidic catalysts generally, and more particularly those which are especially active in promoting the synthesis of aliphatic acids in accord with the known process of preparing these acids by the interaction of aliphatic alcohols with carbon monoxide, which give a pH value in aqueous solution of less than 7, may, if desired, be employed for catalyzing the reaction of this invention. A number of the catalysts which are suitable, all of which catalysts are of an acidic nature, include, for example, the inorganic acids and more particularly hydrochloric acid; inorganic acidic salts, such, for example, as potassium acid sulfate, sodium acid phosphate, boron fluoride; and generally the acidic catalysts designated in the patents to A. T. Larson, J. C. Woodhouse and G. B. Carpenter, Nos. 2,037,654, 2,053,233, and 1,924,766 respectively. Organic acids and organic acid salts may likewise be employed, such, for example, as formic, acetic, glycolic acids and their salts and acid esters.

These catalysts may be used in amounts ranging up to 1.0 mol thereof per mol of formaldehyde. Higher proportions, however, may be used in many instances, such, for example, as in processes in which boron trifluoride or hydrochloric acid are employed as a catalyst wherein they may be employed in amounts up to and even greater than molal proportions with the formaldehyde, but usually, in order to facilitate the separation of the glycolic acid or its derivatives from the reaction product, it is preferable to employ proportions of the catalyst within the range specified. It will be found that with increased catalyst amount the reaction will proceed at a lower temperature and/or pressure while with decreased catalyst amount a somewhat higher temperature and/or pressure is required to effect the reaction at an equal rate.

For the preparation of glycolic acid it is preferable to have a quantity of water present equal to at least 0.5 mol of water per mol of the formaldehyde present. While concentrations of water higher than 1.0 mol per mol of formaldehyde may be present the higher concentrations, say, 15 to 20 mols per mol of formaldehyde, are not used advisedly for they tend to lower the concentration of the product with resultant greater difficulty in subsequent concentration thereof. To partially or completely replace water, compounds which decompose under conditions of the reaction to form water may be present, especially aliphatic monohydric alcohols, e. g., methanol, ethanol, propanol, and the like.

The carbon monoxide required for the synthesis may conveniently be derived from various commercial sources, as, for example, from water gas, producer gas, etc., by liquefaction or other methods and should for best results be relatively pure. The carbon monoxide should preferably be present in sufficient excess to insure an adequate supply thereof for absorption by the formaldehyde in order to inhibit any appreciable decomposition of the formaldehyde to carbon monoxide and hydrogen or other products.

The reaction proceeds at ordinary pressures although it is advantageous to use pressures in excess of atmospheric, say from 5 to 1500 atmospheres or more. The reaction which is exothermic, may be effected over a wide range of temperatures although the optimum temperature varies with specific conditions depending, inter alia, upon the relative concentrations of catalysts, water, formaldehyde and carbon monoxide. Generally, the reaction can be carried out at temperatures ranging from 50° C. to 350° C., although temperatures ranging between 140 and 225° C. have been found preferable. Mild cooling means should generally be provided to maintain the temperature within the selected range. By subjecting the reactants to temperatures and pressures within the designated ranges the normally liquid reactants are maintained in the liquid phase and apparently the carbon monoxide is forced into the liquid and reacts therein with the formaldehyde and water present. While the invention is not limited to any theory or explanation of the operation of the process the foregoing appears satisfactorily to explain its mechanism and accordingly in certain of the claims the process is designated as being conducted in the liquid phase for the reaction appears to take place primarily, if not entirely, in that phase.

The reaction product consists essentially of a solution containing glycolic acid, a small amount of formic acid, unconverted formaldehyde, the catalyst, if such be used, and a considerable portion of water. The glycolic acid may be separated from this crude mixture by distillation which is preferably carried out at from 80 to 100 mm. mercury pressure. After distillation of the greater portion of the free water, formic acid, alcohol, and unchanged formaldehyde, the residue may be neutralized, e. g., with calcium carbonate, to convert the glycolic acid into a readily separable salt, or the residue may be esterified with a suitable alcohol for removal of the glycolic acid as an ester. If desired, glycolic acid may be recovered from the concentrated solution by crystallization, after separation of the catalyst and removal of excess water under reduced pressures.

The following examples will illustrate methods of practicing the invention although it will be understood that the invention is not limited to the details therein given. The percentage yields given are calculated on the formaldehyde used.

*Example I.*—There was placed in a high pressure silver lined autoclave an aqueous solution containing 1 mol of formaldehyde, as solid trioxymethylene, 9 mols of water and 0.1 mol of concentrated sulfuric acid. A carbon monoxide atmosphere was superimposed above the liquid and its pressure increased to 900 atmospheres. The autoclave and contents were heated to a temperature between 130 and 200° C. for a period of approximately 60 minutes, with continuous agitation. The pressure was released and the contents of the autoclave upon analysis gave 94% yield of glycolic acid.

*Example II.*—A silver lined high pressure autoclave was charged with a solution containing on a molal basis 1 part of formaldehyde, 0.1 part of hydrochloric acid, and 6 parts of water. Over this solution a carbon monoxide pressure of 900 atmospheres was imposed and the temperature of the autoclave maintained between 140 and 200° C. for 60 minutes. The product contained 75.5% of glycolic acid.

*Example III.*—The process described in Example 1 was repeated with the same type autoclave, charge and carbon monoxide pressure, but with only 2½ mols of water per mol of formaldehyde in the reaction medium. The autoclave and contents were raised to a reaction temperature of between 180 and 205° C. in 5 minutes and maintained at a temperature within this range for approximately 35 minutes. The product upon analysis gave 57% glycolic acid.

*Example IV.*—An autoclave charge containing 1 mol of formaldehyde, 2.5 mols of water and 0.757 mols of hydrochloric acid was reacted with carbon monoxide at 900 atmospheres, the temperature ranging between 155 and 180° C. the reaction period being approximately 35 minutes. The product contained approximately 58% glycolic acid.

*Example V.*—An autoclave charge containing 1 mol of formaldehyde, 1 mol of hydrochloric acid and approximately 9 mols of water was reacted with carbon monoxide at approximately 900 atmospheres, pressure for about 35 minutes, at a temperature ranging between 150 and 200° C. A 95.5% conversion to glycolic acid was realized.

*Example VI.*—Glycolic acid was produced using boron fluoride as the catalyst. A silver lined autoclave was charged with 1 mol of boron fluoride, 1.8 mols of water and 1 mol of paraformaldehyde. A carbon monoxide pressure ranging between 300 and 900 atmospheres was maintained throughout the reaction which was carried out at a temperature between 60 and 86° C. for approximately 82 minutes.

*Example VII.*—A silver lined autoclave was charged with 1 mol of formaldehyde, as solid trioxymethylene, 16 mols of water, and 4 mols of formic acid. A carbon monoxide pressure of 800–900 atmospheres and a temperature of 150° C., were maintained for 60 minutes. A 53.6% conversion of formaldehyde to glycolic acid was obtained.

*Example VIII.*—Example VII was repeated at the same pressure with a charge containing 1 mol of formaldehyde, 6 mols of water and 0.1 mol of phosphoric acid at a temperature of 250° C. A 24.3% conversion of formaldehyde to glycolic acid was realized.

*Example IX.*—Glycolic acid was obtained in accord with the process of Example III which was carried out with a charge of 1 mol of formaldehyde, 6 mols of water and 0.5 mol of glycolic acid, a temperature of 180–260° C. and similar carbon monoxide pressures.

*Example X.*—An autoclave charge containing 1 mol of formaldehyde and 8 mols of water was reacted with carbon monoxide at approximately 900 atmospheres pressure for about 60 minutes and at a temperature ranging between 259° C. and 270° C. Approximately 12.7% glycolic acid was obtained.

While the examples have referred particularly to carrying out the process in a more or less discontinuous manner the process of the invention may likewise be effected in a continuous manner by passing the aldehyde, water and catalyst through a reaction zone either co-current or countercurrent to the flow of carbon monoxide, the rates of flow being adjusted to yield the desired degree of reaction. The carbon monoxide should be maintained, as in the processes described in the examples, at a suitable pressure and the temperature of the continuous reaction should be held within the prescribed range by suitable heating means.

After the reaction starts glycolic acid is present in the reaction zone and when conditions are such as are shown in Examples III, IV, and VI, glycolic acid will react with itself to form glycolides. In all of these examples glycolides were present in appreciable amounts. Furthermore, due to the ease with which the well known glycolide reaction occurs, which may readily be effected by simply heating the reaction products or, for that matter, by failing to cool the reaction product promptly after the reaction, it is evident that appreciable quantities of glycolides may be present in the product. Accordingly, it will be understood that hereinafter when it is stated in the specification or claims that glycolic acid is produced the possible production of the glycolid is also contemplated.

In order to insure adequate intimate contact between the reactants, thorough stirring is an essential to high yields when conducting the process in an autoclave and no matter what the type of reaction vessel used intimate contact is of considerable importance if optimum results are desired.

Because of the corrosive nature of the catalyst and reactants it is advisable to carry out the process of the present invention in glass, silica, porcelain-lined or glass-lined vessels, or the inner surfaces of the reaction vessel which contact with the reactants should be constructed of such corrosion-resistant metals as silver, chromium, stainless steel, and the like.

When formaldehyde is referred to in the appended claims it will be understood that paraformaldehyde, formalin, or trioxymethylene or other polymeric or monomeric form of formaldehyde as well as formaldehyde are also included.

From a consideration of the above specification it will be appreciated that many details therein given may be changed without departing from the scope of the invention or sacrificing any of the advantages that may be derived therefrom.

I claim:

1. A process for the preparation of glycolic acid which comprises reacting, in the liquid phase, formaldehyde, water and carbon monoxide in the presence of an acidic catalyst, at a temperature between 50° and 350° C. and at a pressure between 5 and 1500 atmospheres.

2. The process of producing glycolic acid by introducing into a reaction vessel and subjecting to liquid phase reaction, carbon monoxide, formaldehyde and water.

3. The process of claim 2 wherein the hydrogen ion concentration of the reactant mixture is on the acid side of pH=7.

4. The process of claim 2 conducted in the presence of an acidic catalyst adapted for carrying out the interaction of aliphatic alcohols with carbon monoxide to give aliphatic organic acids.

5. The process of claim 2 conducted at a pressure of from 5 to 1500 atmospheres.

6. The process of claim 2 conducted at a temperature of from 50° to 350° C.

7. The process of claim 2 wherein the water in the reaction mixture is in molal excess over the formaldehyde.

8. A process for the preparation of glycolic acid which comprises introducing into a reaction vessel carbon monoxide and an aqueous solution of formaldehyde and effecting reaction thereof at a temperature between 50° and 350° C. and a pressure of at least 5 atmospheres.

9. A process for the preparation of glycolic acid which comprises introducing into a reaction vessel carbon monoxide and an aqueous solution of formaldehyde and effecting reaction thereof at a temperature between 140° and 225° C. and a pressure of at least 5 atmospheres.

10. The process of claim 9 conducted in the presence of from 0.2 to 1 mol of an acidic type catalyst per mol of formaldehyde.

11. The process of claim 9 conducted in the presence of sulfuric acid as the catalyst.

12. The process of claim 9 wherein the reactants are retained in the reaction zone for not more than 60 minutes.

13. A process for the preparation of glycolic acid which comprises introducing into a reaction vessel carbon monoxide and an aqueous solution of formaldehyde containing, per mol of formaldehyde at least 0.5 mol of water and from 0.2 to 1 mol of an acidic type catalyst, and effecting reaction thereof under the combined influence of heat and pressure.

14. The process which comprises introducing into a reaction vessel and reacting carbon monoxide, formaldehyde and water and thereby producing glycolic acid.

15. The process of claim 14 conducted in the presence of an acidic catalyst.

16. The process of claim 14 conducted in the presence of hydrochloric acid as the catalyst.

17. The process of claim 14 conducted in the presence of sulfuric acid as the catalyst.

18. The process of claim 14 conducted in the presence of boron trifluoride as the catalyst.

19. The process of claim 14 conducted at a temperature of from 50 to 350° C. and a pressure of at least 5 atmospheres.

20. The process of producing glycolic acid by introducing into a reaction vessel carbon monoxide, formaldehyde and water and maintaining them at a temperature of from 50° to 350° C. and a pressure of at least 5 atmospheres until no further carbon monoxide is absorbed.

21. In a process for the preparation of glycolic acid the steps of introducing into a reaction vessel and reacting carbon monoxide, formaldehyde and water, while supplying carbon monoxide in excess of that required for the reaction.

22. A process for the preparation of glycolic acid which comprises interacting formaldehyde, carbon monoxide and water in accord with the equation:

$$CO + H_2O + HCHO \rightarrow CH_2OHCOOH$$

at a temperature between 50 and 350° C. and a pressure of at least 50 atmospheres.

23. In a process for the preparation of glycolic acid the steps which comprise introducing carbon monoxide into a reaction zone containing formaldehyde, water and a catalyst of an acidic nature and by the application of heat and pressure producing glycolic acid therein.

24. A process for the preparation of glycolic acid which comprises reacting approximately 1 mol of formaldehyde, 6 mols of water and 0.1 mol of hydrochloric acid with carbon monoxide at a temperature between 140° and 200° C. and at a pressure of 900 atmospheres for a period of approximately 60 minutes.

25. A process for the preparation of glycolic acid by a continuous process which comprises passing a mixture containing approximately 1 mol of formaldehyde, 6 mols of water and 0.1 mol of hydrochloric acid with carbon monoxide at a temperature between 140° C. and 200° C., into a reaction zone and conducting the reaction therein under a pressure of 900 atmospheres for a period of approximately 60 minutes, distilling the reaction product at pressures below 100 mm. and subsequently separating the glycolic acid from the concentrate.

26. A process of producing glycolic acid by introducing carbon monoxide into a reaction vessel and subjecting to liquid phase reaction with formaldehyde and water.

27. A process of producing glycolic acid by introducing carbon monoxide and water into a reaction vessel, subjecting to liquid phase reaction, with formaldehyde and water, and in the presence of an acidic catalyst.

DONALD JOHN LODER.